(12) United States Patent
Friedli

(10) Patent No.: US 10,200,836 B2
(45) Date of Patent: Feb. 5, 2019

(54) CONFIGURING TERMINAL DEVICES

(71) Applicant: Inventio AG, Hergiswil (CH)

(72) Inventor: Paul Friedli, Remetschwil (CH)

(73) Assignee: Inventio AG, Hergiswil NW (CH)

( * ) Notice: Subject to any disclaimer, the term of this patent is extended or adjusted under 35 U.S.C. 154(b) by 12 days.

(21) Appl. No.: 15/313,415

(22) PCT Filed: May 13, 2015

(86) PCT No.: PCT/EP2015/060586
§ 371 (c)(1),
(2) Date: Nov. 22, 2016

(87) PCT Pub. No.: WO2015/177020
PCT Pub. Date: Nov. 26, 2015

(65) Prior Publication Data
US 2017/0190543 A1   Jul. 6, 2017

(30) Foreign Application Priority Data
May 23, 2014 (EP) .................................... 14169658

(51) Int. Cl.
H04L 12/02 (2006.01)
H04W 4/50 (2018.01)
H04L 12/24 (2006.01)
B66B 1/34 (2006.01)
H04W 4/00 (2018.01)
B66B 1/46 (2006.01)

(52) U.S. Cl.
CPC ................ H04W 4/50 (2018.02); B66B 1/34 (2013.01); B66B 1/466 (2013.01); H04L 12/02 (2013.01); H04L 41/0809 (2013.01); H04W 4/00 (2013.01)

(58) Field of Classification Search
CPC .................................. H04L 12/02; B66B 1/34
USPC .......................................................... 187/296
See application file for complete search history.

(56) References Cited

U.S. PATENT DOCUMENTS

| 6,801,792 | B1 * | 10/2004 | Schuster | ................. B66B 1/468 187/391 |
| 7,830,838 | B2 * | 11/2010 | Kohvakka | ............. H04W 16/14 370/330 |
| 9,473,959 | B2 * | 10/2016 | Morrill | ................. H04W 24/02 |
| 2004/0262093 | A1 * | 12/2004 | Forsythe | ................... B66B 1/34 187/391 |
| 2005/0241883 | A1 * | 11/2005 | Zuzuly | ...................... B66B 1/24 187/277 |
| 2006/0020416 | A1 * | 1/2006 | Karasek | ................ B66B 1/3492 702/141 |

(Continued)

FOREIGN PATENT DOCUMENTS

| WO | 2013/012409 A1 | 1/2013 | |
| WO | WO 2013038060 A1 * | 3/2013 | ............. B66B 3/002 |
| WO | 2013/053606 A1 | 4/2013 | |

OTHER PUBLICATIONS

International Search Report and Written Opinion dated Jul. 15, 2015 in International Application No. PCT/EP2015/060586.

Primary Examiner — David Warren
(74) Attorney, Agent, or Firm — Baker & Hostetler LLP

(57) ABSTRACT

An electronic terminal device can be configured using a device identifier that is input into the device. The terminal device sends the device identifier to a configuration server. The configuration server responds by sending configuration information to the terminal device based on the device identifier.

10 Claims, 9 Drawing Sheets

(56) References Cited

U.S. PATENT DOCUMENTS

| | | | |
|---|---|---|---|
| 2006/0191750 A1* | 8/2006 | Sekimoto | B66B 3/00 187/391 |
| 2006/0265386 A1 | 11/2006 | Richter | |
| 2007/0025306 A1 | 2/2007 | Cox et al. | |
| 2007/0268516 A1 | 11/2007 | Bugwadia et al. | |
| 2009/0013032 A1 | 1/2009 | Blatherwick et al. | |
| 2009/0236183 A1* | 9/2009 | Bordwell | B66F 3/46 187/234 |
| 2009/0319640 A1* | 12/2009 | Kugel | H04L 41/0806 709/220 |
| 2014/0155046 A1* | 6/2014 | Morrill | H04W 24/02 455/418 |
| 2015/0011201 A1* | 1/2015 | Morrill | H04W 24/02 455/418 |
| 2016/0280509 A1* | 9/2016 | Sonnenmoser | B66B 5/0031 |
| 2017/0190543 A1* | 7/2017 | Friedli | B66B 1/34 |
| 2017/0313546 A1* | 11/2017 | King | B66B 1/2491 |
| 2017/0362054 A1* | 12/2017 | Legeret | B66B 5/0012 |
| 2018/0120793 A1* | 5/2018 | Tiwari | G06Q 10/04 |

* cited by examiner

| Floor Index | Floor Name | ID | Terminal Descriptor | X | Y |
|---|---|---|---|---|---|
| 1 | 1 | EFBT7J | P+1/1 | 6.68 m | 9.48 m |
| 1 | 1 | EFDW8W | P+1/2 | 16.38 m | 5.06 m |
| 1 | 1 | EFBEL3 | P+1/3 | 4.76 m | 10.52 m |
| 1 | 1 | EFAYYI | P+1/4 | 2.86 m | 10.54 m |
| 1 | 1 | EFBEM4 | P+1/5 | 4.71 m | 11.86 m |
| 1 | 1 | EFAYZJ | P+1/6 | 2.86 m | 11.86 m |
| 1 | 1 | EFBEO6 | P+1/7 | 4.71 m | 13.16 m |
| 1 | 1 | EFAZ2N | P+1/8 | 2.86 m | 13.14 m |
| 2 | 2 | EGUBNP | P+2/1 | 6.90 m | 9.52 m |
| 2 | 2 | EGWEO3 | P+2/2 | 16.58 m | 5.06 m |
| 2 | 2 | EGWM4Y | P+2/3 | 17.08 m | 9.52 m |
| 3 | 3 | EIDT4Y | P+3/1 | 6.90 m | 9.52 m |
| 3 | 3 | EIFW5C | P+3/2 | 16.58 m | 5.06 m |
| 3 | 3 | EIG4K9 | P+3/3 | 17.08 m | 9.52 m |
| 4 | 4 | EJWBK5 | P+4/1 | 6.90 m | 9.52 m |
| 4 | 4 | EJYELI | P+4/2 | 16.58 m | 5.06 m |
| 4 | 4 | EJYM1E | P+4/3 | 17.08 m | 9.52 m |
| 5 | 5 | ELFT1E | P+5/1 | 6.90 m | 9.52 m |
| 5 | 5 | ELHW2R | P+5/2 | 16.58 m | 5.06 m |
| 5 | 5 | ELI4HO | P+5/3 | 17.08 m | 9.52 m |
| 6 | 6 | EMYBHK | P+6/1 | 6.90 m | 9.52 m |
| 6 | 6 | EN1EI2 | P+6/2 | 16.58 m | 5.06 m |
| 6 | 6 | EN1LXV | P+6/3 | 17.08 m | 9.52 m |
| 7 | 7 | EOHSXR | P+7/1 | 6.90 m | 9.52 m |
| 7 | 7 | EOJVY5 | P+7/2 | 16.58 m | 5.06 m |
| 7 | 7 | EOK4E4 | P+7/3 | 17.08 m | 9.52 m |
| 8 | 8 | EQ1BE4 | P+8/1 | 6.90 m | 9.52 m |
| 8 | 8 | EQ3EFH | P+8/2 | 16.58 m | 5.06 m |
| 8 | 8 | EQ3LUB | P+8/3 | 17.08 m | 9.52 m |
| 9 | 9 | ERJSU7 | P+9/1 | 6.90 m | 9.52 m |
| 9 | 9 | ERLVVK | P+9/2 | 16.58 m | 5.06 m |
| 9 | 9 | ERM4BJ | P+9/3 | 17.08 m | 9.52 m |
| 10 | 10 | ET3BBJ | P+10/1 | 6.90 m | 9.52 m |
| 10 | 10 | ET5ECW | P+10/2 | 16.58 m | 5.06 m |
| 10 | 10 | ET5LRQ | P+10/3 | 17.08 m | 9.52 m |

FIG. 8

CONFIGURING TERMINAL DEVICES

CROSS-REFERENCE TO RELATED APPLICATIONS

This application is the national phase application under 35 U.S.C. § 371 claiming the benefit of priority based on International Patent Application No. PCT/EP2015/060586, filed on May 13, 2015, which claims the benefit of priority based on European Patent Application No. 14169658.3, filed on May 23, 2014. The contents of each of these applications are herein incorporated by reference.

BACKGROUND

This disclosure relates to configuring terminal devices in, for example, an access control system or an elevator system.

Electronic systems in buildings or at other locations often comprise multiple electronic devices that are connected by a network. In at least some cases, one or more of these devices is configured by inputting configuration information for that particular device. However, configuring the devices can be time-consuming and error-prone.

WO2013012409A1 describes a system for controlling the appearance of an elevator passenger interface device. A user can configure an appearance file, which is then used to provide an image file to the passenger interface device. A plurality of passenger interface devices can be configured over a network using a server.

US20060265386A1 describes a method for configuring a thin client connected to a communications network. The thin client sends a request for configuration information to a configuration server. The request for configuration information includes information on the thin client. The configuration server generates a configuration file containing configuration information based on the received thin client information. The configuration file is then sent by the configuration server to the thin client, which uses the configuration file for configuration.

Further options for configuring electronic devices could be advantageous. This is addressed by at least some of the embodiments covered by the claims.

SUMMARY OF THE INVENTION

An electronic terminal device can be configured using a device identifier that is input into the device. The terminal device sends the device identifier to a configuration server. The configuration server responds by sending configuration information to the terminal device based on the device identifier.

Accordingly, in one embodiment a method includes receiving, using a terminal device in a building, a device identifier for the terminal device, sending the device identifier from the terminal device to a configuration server, receiving configuration information for the terminal device from the configuration server, and configuring the terminal device based on the configuration information. The configuration information includes a physical location of the terminal device in the building.

In one embodiment, the configuration information includes an orientation of the terminal device relative to a surface of the building. This improves flexibility in laying out electronic systems in the building.

In yet another embodiment, the configuration information includes an elevator group with which the terminal device works. And in a further embodiment, the terminal device includes a destination call input device for an elevator system. These embodiments allow use of the terminal device in connection with an elevator system.

In one embodiment, the terminal device includes a lock for a door. This embodiment allows use of the terminal device in connection with an access system.

In one embodiment, the device identifier includes a string or a number. The string or number may be used regardless of whether the terminal device is used in connection with an elevator system or an access system.

In one embodiment, the device identifier is received by the terminal device over a wireless connection. This also improves flexibility in laying out electronic systems in the building.

In a further embodiment, the method includes generating the configuration information using a computer-based layout tool. Such a tool can be used to create the device identifiers for the terminal devices.

A system includes a configuration server, and a terminal device in a building. The terminal device is coupled to the configuration server and programmed to receive a device identifier for a terminal device in a building, to send the device identifier to a configuration server, to receive configuration information for the terminal device from the configuration server, and to configure the terminal device based on the configuration information. The configuration information includes a physical location of the terminal device in the building.

In one embodiment, the system includes a removable storage medium coupled to the configuration server, wherein the removable storage medium storing the configuration information.

Further embodiments comprise a computer-based device configured to perform one or more of the disclosed methods.

At least some embodiments of the disclosed methods can be implemented using a computer or computer-based device that performs one or more method acts, the computer or computer-based device having read instructions for performing the method acts from one or more computer-readable storage media. The computer-readable storage media can comprise, for example, volatile memory components (such as DRAM or SRAM), nonvolatile memory components (such as hard drives, optical disks, Flash RAM, or ROM), or both. The computer-readable storage media do not cover pure transitory signals. The methods disclosed herein are not performed solely in the human mind.

BRIEF DESCRIPTION OF THE DRAWINGS

The disclosure refers to the following figures, in which:

FIG. 8 shows an exemplary embodiment of one type of supporting documentation.

DETAILED DESCRIPTION OF THE INVENTION

Figure 1:
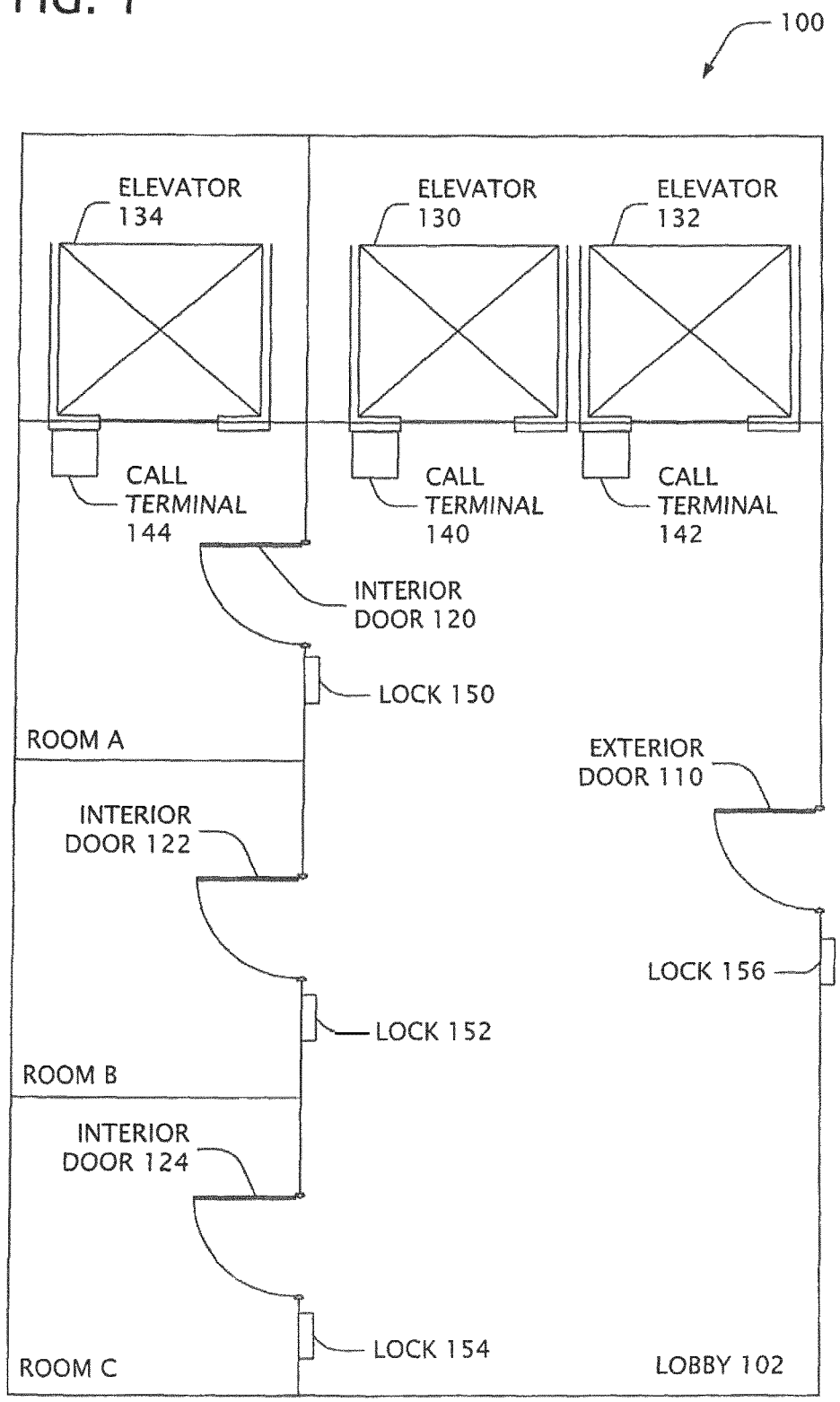
FIG. 1 shows a plan view of a building floor.

FIG. 1 shows a plan view of a building floor 100. The floor 100 comprises a lobby area 102, which is accessible through an exterior door 110. From the lobby 102, rooms A, B, and C can be accessed through interior doors 120, 122, and 124, respectively. The lobby 102 also provides access to one or more elevators 130, 132, which provide access to other floors in the building. In room A, an additional elevator 134 is also accessible. In some cases, the elevators 130, 132 are passenger elevators, while the elevator 134 is a service or freight elevator. In other cases, all of the elevators 130, 132, 134 are passenger elevators, or they are all service or freight elevators.

Although many of the disclosed embodiments are described in the context of a system arranged within a building, further embodiments comprise a system that is only partially in a building or that is not in a building.

Figure 2:
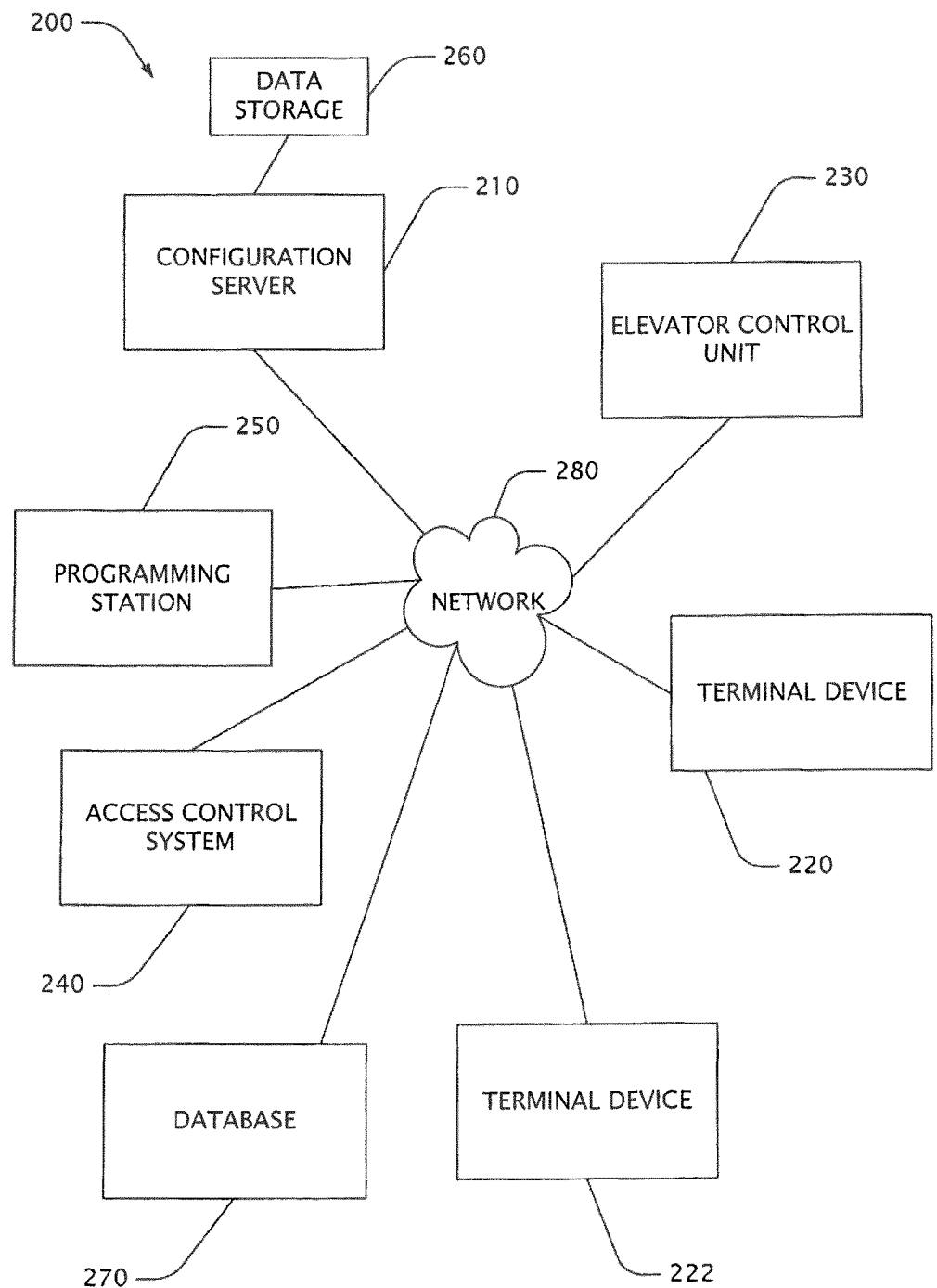
FIG. 2 shows a block diagram of an exemplary embodiment of a building system.

FIG. 2 shows a block diagram of an exemplary embodiment of a building system 200. Generally, the system 200 can be used in a setting such as the building floor 100, as well as in other settings. The system 200 comprises a configuration server 210 and one or more terminal devices 220, 222. Generally, a terminal device is a computer-based component that has an assigned physical location within an area (e.g., with the building floor 100) and that communicates with other components in the system 200. Possible examples of terminal devices can include call entry terminals for an elevator system, and electronic locks for an access control system. In the particular context of the floor 100 of FIG. 1, call entry terminals 140, 142, 144 of the elevator system are terminal devices. The electronic locks 150, 152, 154, 156 of FIG. 1, which control access to the doors 110, 120, 122, 124, are also terminal devices.

Returning to FIG. 2, the system 200 further comprises a data storage component 260, which stores configuration information related to the terminal devices 220, 222. The data storage component 260 can be internal or external to the configuration server 210, and can comprise any computer-readable storage medium. In particular cases, the data storage component 260 comprise a MultiMedia Card (MMC) or a secure digital (SD) card.

In some cases, the system 200 further comprises a programming station 250. In particular embodiments, the system 200 comprises an elevator control unit 230, which directs the operation of one or more elevators. In additional embodiments, the system 200 also comprises an access control system 240. The system 200 can comprise a database 270, which contains user information, other information, or both.

The various components of the system 200 can be communicatively coupled to each other through a network 280. In different embodiments, the network 280 comprises wired connections, wireless connections, or both.

Figure 3:
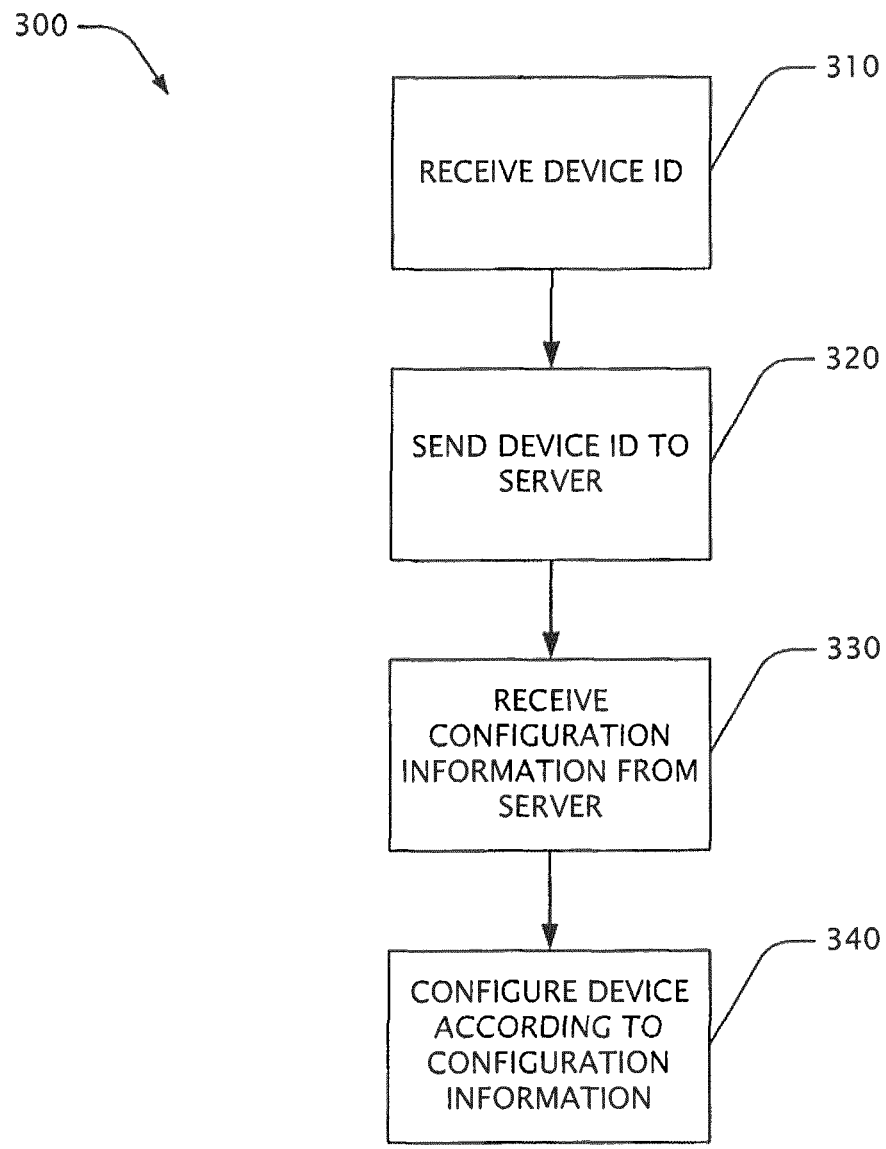
FIG. 3 shows a block diagram of an exemplary embodiment of a method for configuring a terminal device.

FIG. 3 shows a block diagram of an exemplary embodiment of a method 300 for configuring a terminal device, such as the terminal devices 220, 222 of FIG. 2. In a method act 310, the terminal device receives a device identifier through an input-output interface. The device identifier comprises information that allows the terminal device to be distinguished from one or more other terminal devices in the system. The device identifier can take the form of a number, a string, another type of information, or any combination of these.

In a method act 320, the terminal device sends the device identifier to a configuration server.

In response, the terminal device receives, from the server, configuration information for the terminal device. The configuration information may be send in XML or any other suitable format. This occurs in a method act 330. The configuration information allows the terminal device to configure itself for operation with the building system, for example, with an elevator system or with an access control system. The configuration information can specify, for example: a physical location of the terminal device; an orientation of the terminal device relative to another surface (e.g., landscape orientation, portrait orientation); an elevator group with which the terminal device operates; type of building (e.g., office building, hospital, hotel or apartment).

Based on the configuration information, the terminal device configures itself in a method act 340. The terminal device can then operate with the building system.

Figure 4:
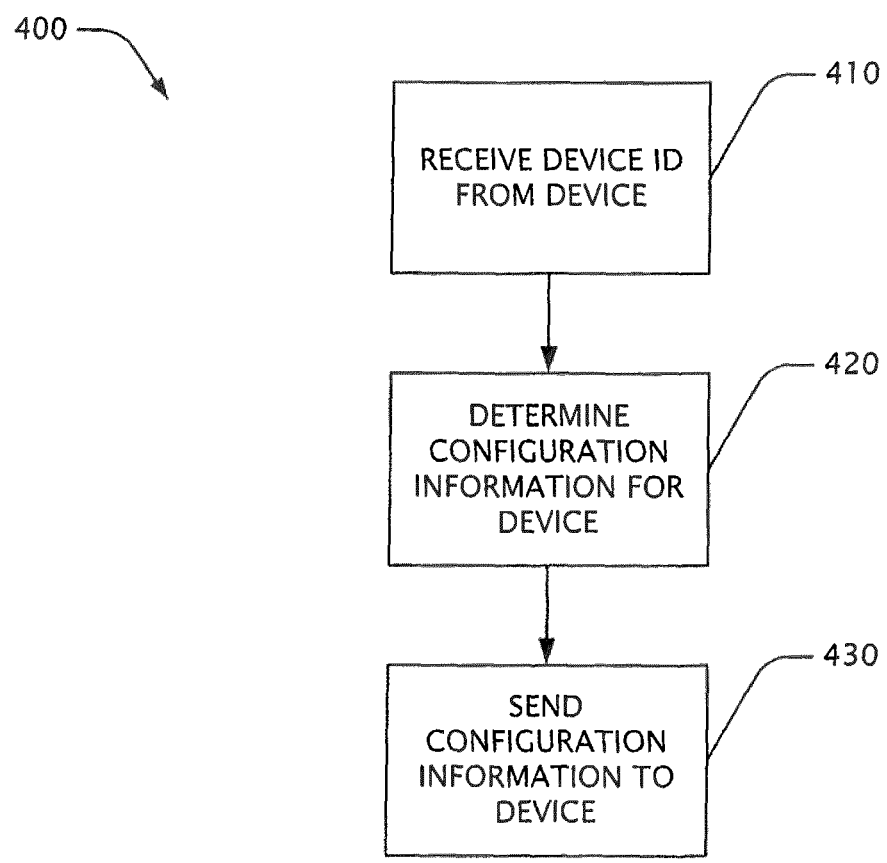
FIG. 4 shows a block diagram of another exemplary embodiment of a method for configuring a terminal device.

FIG. 4 shows a block diagram of an exemplary embodiment of a method 400 for configuring a terminal device, such as the terminal devices 220, 222 of FIG. 2. Generally, the method 400 is performed by a configuration server, such as the configuration server 210 of FIG. 2. In a method act 410, the configuration server receives a device identifier from a terminal device. In a method act 420, the configuration server determines the configuration information for the terminal device based on the device identifier. For example, the configuration information can be read by the configuration server from a computer-readable medium, such as the data storage component 260 of FIG. 2. In a method act 430, the configuration server sends the configuration information to the terminal device. The terminal device can thus configure itself using the configuration information.

Figure 5:
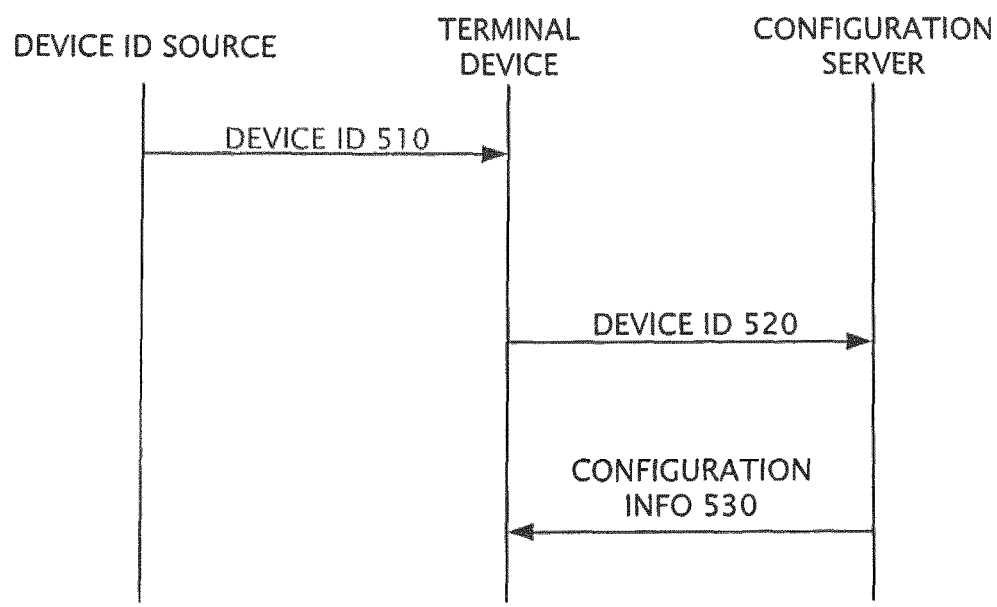
FIG. 5 depicts an exemplary signal exchange between system components.

FIG. 5 depicts an exemplary signal exchange between components of at least some of the disclosed embodiments. In a signal 510, a device identifier is communicated from a device identifier source to a terminal device. In some cases, the device identifier source is a person who inputs the device identifier into the terminal device through a user interface (e.g., a keypad, a touchscreen, or another interface). In other cases, the device identifier source is a computer-readable storage device from which the terminal device reads the device identifier. This reading can occur in a wired or wireless manner. The storage device could comprise, for example, an RFID (radio-frequency identification) tag, an NFC (near-field communication) tag, an optical code, or an MMC or other type of removable storage device.

In a signal 520, the terminal device communicates the device identifier to the configuration server. Upon determining the configuration information, the server sends the configuration information to the terminal device in a signal 530. The terminal device can then configure itself using the configuration information.

Figure 6:
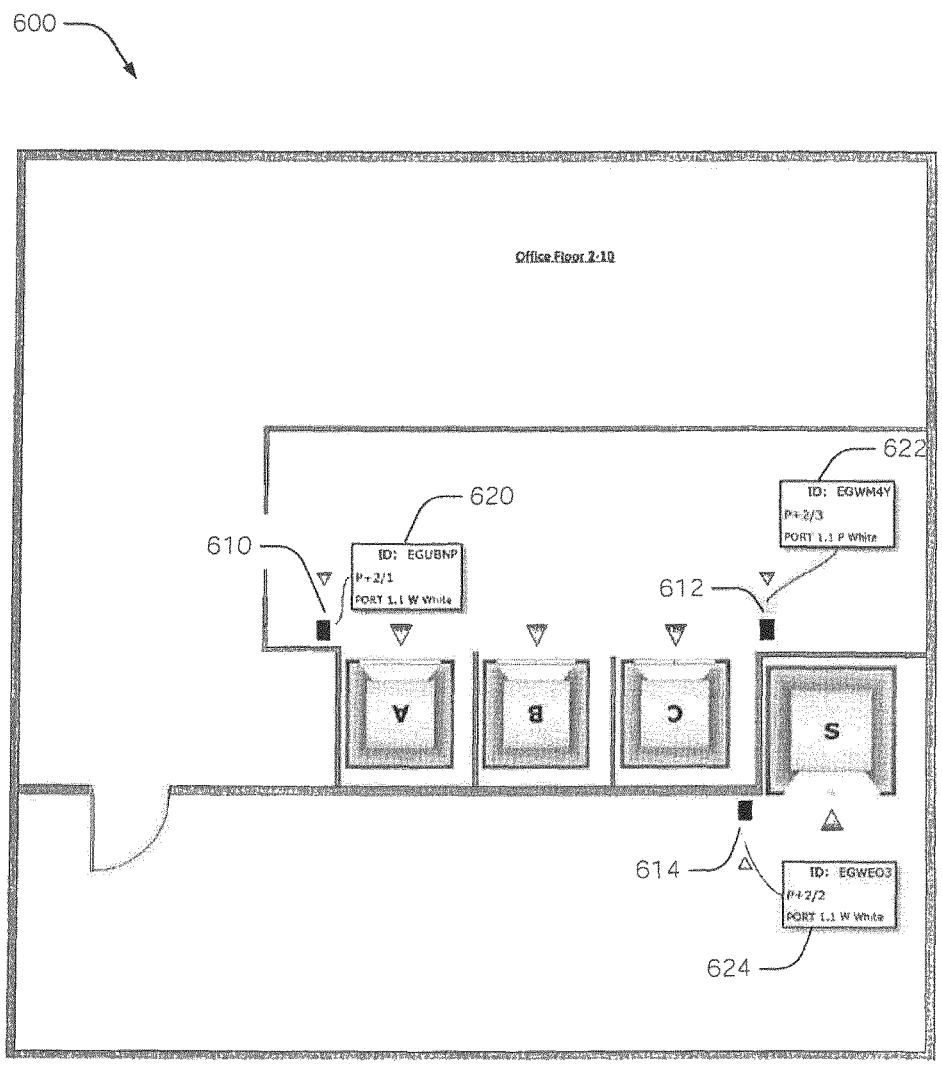
FIG. 6 shows an example of an elevator system layout that was generated using a layout tool.

In some embodiments, the device identifiers for terminal devices in a system are created using a computer-based layout tool, such as a computer-assisted design (CAD) tool. The CAD tool can be run on the programming station 250, for example. CAD tools are generally known in many industries; one example of a CAD tool used for elevator system layouts is Leegoo Builder from EAS Engineering Automation Systems GmbH of Germany. FIG. 6 shows an example of an elevator system layout 600 that was generated using a layout tool. The layout 600 depicts floor two of a ten-floor elevator installation. The floor is served by passenger elevators A, B, and C, and by a service elevator S. The layout includes three destination call terminals 610, 612, 614. In this particular layout, the terminals 610, 612, 614 are PORT terminals, available from the Schindler Group of Switzerland. The layout 600 depicts, among other things, the physical location of the elevators and the terminals on the building floor.

Figure 7:
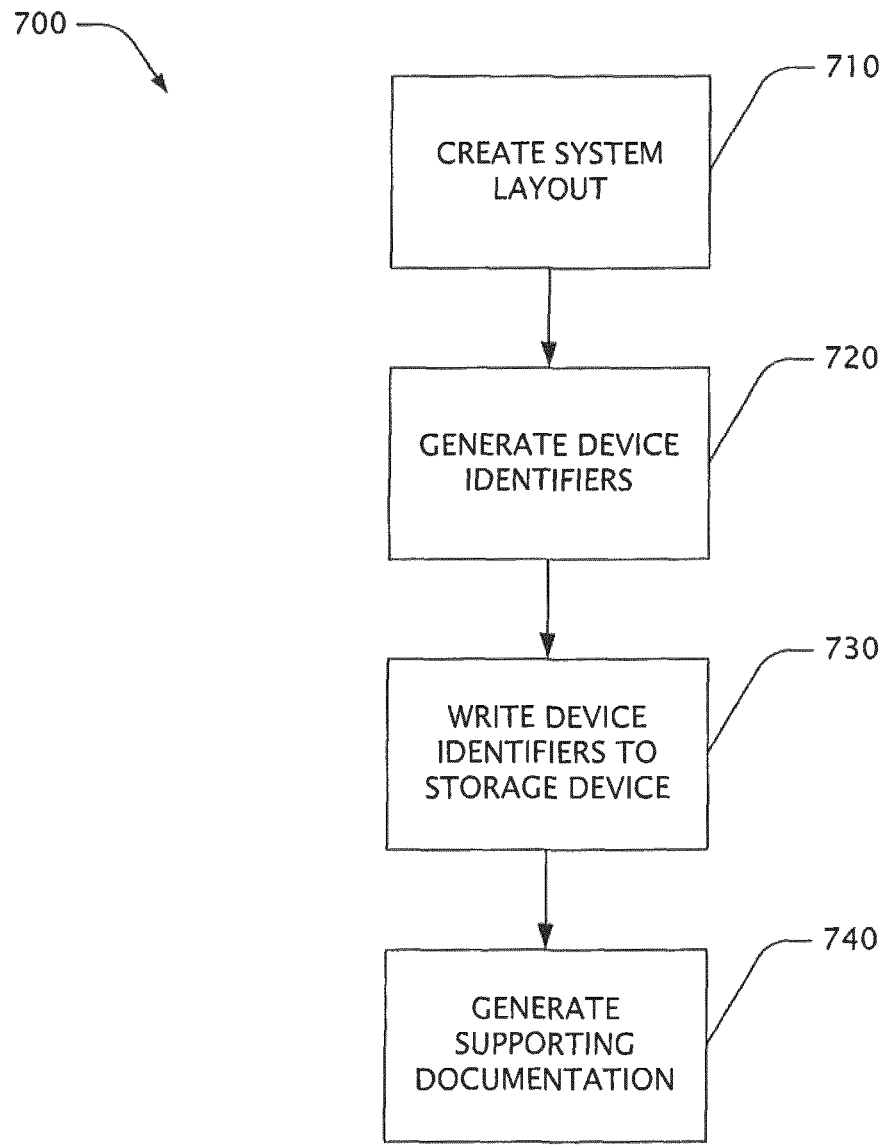
FIG. 7 shows a block diagram of an exemplary embodiment of a method of creating device identifiers using a computer-based layout tool.

FIG. 7 shows a block diagram of an exemplary embodiment of a method 700 of creating device identifiers using a computer-based layout tool. In a method act 710, a layout of the elevator system is created. The layout can include information about, for example: the locations of walls, doors, and other building structures; the location of elevator shafts, doors, call entry devices, and other elevator system elements; how elements of the elevator system are connected to each other, including wiring information; other information; or any combination of these. The layout can be created using manual input, using automated techniques, or using both.

In a method act 720, device identifiers for one or more terminal devices are created and associated with the corresponding configuration information. In some cases, the device identifiers are based on manual input from a user (e.g., the user selects the identifiers). In other cases, the device identifiers are generated according to a pattern, generated randomly, or generated pseudo-randomly. FIG. 6 shows examples of possible device identifiers, which in this case are depicted with the layout 600. In this depiction, callout box 620 shows that the terminal 610 has been assigned a device identifier "EGUBNP". (In this particular embodiment, the device identifier is referred to as "ID".) Callout boxes 622 and 624 show device identifiers for the terminals 612 and 614, respectively. In this particular embodiment, the callout boxes 620, 622, 624 also show additional information about the respective terminals, namely: a name for the terminal (e.g., "P+2/1"); a type name for the terminal (e.g., "PORT 1.1"); a color for the terminal (e.g., "white"); and a mounting style for the terminal (e.g., "W" for wall-mounted, "P" for pedestal-mounted).

In a method act 730, the device identifiers and the configuration information are written to a computer-readable storage device. Using the storage device, the device identifiers and the configuration information can then be transferred, directly or indirectly, to a configuration server.

In some embodiments, supporting documentation for the system layout is created in a method act 740. Generally, "supporting documentation" refers to documents that may be useful in installing or otherwise implementing at least a portion of a planned elevator system. FIG. 8 shows an exemplary embodiment of one possible type of supporting documentation, namely a terminal detail list 800. The list 800 contains information about terminal devices in an elevator installation. A column 810 indicates a floor number for a given terminal device. A column 820 indicates a floor name for a given terminal device. (In this particular example, the floor name is the same as the floor index, but this need not always be the case.) A column 830 indicates the device identifier for a terminal device. Column 840 indicates a terminal descriptor (name) for a terminal device. Columns 850 and 860 indicate the X- and Y-coordinates, respectively, of a terminal device on its particular floor. Other embodiments of the terminal detail list 800 can contain other types of information.

In further embodiments, the supporting documentation comprises a list of parts to be used for a planned installation. The list of parts can include prices for one or more of the parts.

In additional embodiments, the supporting documentation comprises wiring diagrams. The wiring diagrams show, for example, how to connect terminal devices, a configuration server, an elevator control unit, and other components.

In some embodiments, the supporting documentation comprises layout diagrams that show the positions of various system components within a floor. Such diagrams can be similar to those shown in FIG. 6.

Figure 9:
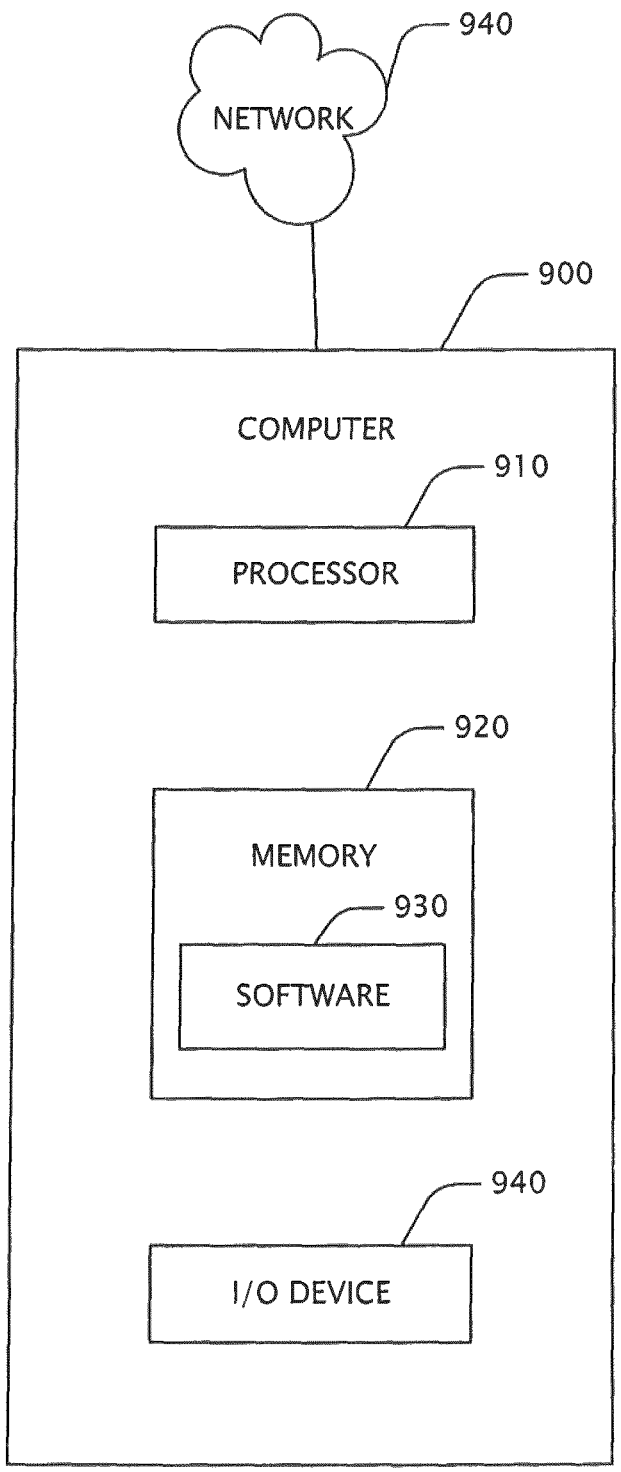
FIG. 9 shows a block diagram of an exemplary embodiment of a computer.

FIG. 9 shows a block diagram of an exemplary embodiment of a computer 900 (e.g., part of a terminal device, part of a configuration server, part of an access control system, part of an elevator control unit, part of a reader, part of a database, part of a programming station) that can be used with one or more technologies disclosed in this application. The computer 900 comprises one or more processors 910. The processor 910 is coupled to a memory 920, which comprises one or more computer-readable storage media storing software instructions 930. When executed by the processor 910, the software instructions 930 cause the processor 910 to perform one or more of the method acts disclosed in this application. Further embodiments of the computer 900 can comprise one or more additional components. In at least some embodiments, the computer 900 can connect to other computers or electronic devices through a network 940. In particular embodiments, the computer 900 works with one or more other computers, which are located locally, remotely, or both. One or more of the disclosed methods can thus be performed using a distributed computing system. The computer 900 can also comprise an input/output device (I/O device) 940 allowing the computer 900 to exchange information with a person or with another electronic device.

Although at least some of the embodiments described in this application are described in the context of an elevator installation, the embodiments are also generally applicable to access-control systems using electronic locks. For example, any of the locks 150, 152, 154, 156 of FIG. 1 can serve as terminal devices. Thus, for example, the lock 150 can be configured using a device identifier, which the lock 150 sends to a configuration server. The lock 150 can then be configured to work with an access control system, with additional devices (e.g., elevator control unit), or with both.

In one non-limiting example, a worker installs a destination call terminal on a building floor. In this case, the destination call terminal is a PORT terminal. After connecting the terminal to the elevator system network, the worker inputs a device identifier ("EFAD5H") using a touch screen on the PORT terminal. The terminal sends the device identifier to a configuration server, which is also connected to the elevator system network. In this case, the configuration server is a PORT Technology Gateway (PTG) from Schindler Group of Switzerland. Based on the device identifier, the configuration server determines configuration information for this particular destination call terminal. Particularly, the configuration server reads the configuration information from an MMC that is connected to the server. The configuration server then sends the configuration information to the destination call terminal. The destination call terminal then configures itself using this information. In this example, the terminal configures itself to operate with a first of two elevator groups in the building (e.g., to place destination calls with the first elevator group). The terminal also configures itself to operate its touch-sensitive display in a landscape orientation. Thus, the terminal is properly configured by inputting only one piece of information (i.e., the device identifier).

At least some of the disclosed embodiments allow for configuring a terminal device for operation on a network without inputting detailed configuration information for the device. Instead, the device can be configured by inputting only the device identifier. It is not necessary for each terminal device to be individually configured before installation (e.g., at the factory where the terminal devices are made). The installation of a terminal device can thus proceed more quickly, with a lower error rate, or both. Installation can thus be less expensive compared to other methods. Since installation of the terminal device is simpler compared to other procedures, installation workers require less time and less training.

Although some embodiments of the various methods disclosed herein are described as comprising a certain number of method acts, further embodiments of a given method can comprise more or fewer method acts than are explicitly disclosed herein. In additional embodiments, method acts are performed in an order other than as disclosed herein. In some cases, two or more method acts can be combined into one method act. In some cases, one method act can be divided into two or more method acts.

Having illustrated and described the principles of the disclosed technologies, it will be apparent to those skilled in the art that the disclosed embodiments can be modified in arrangement and detail without departing from such principles. In view of the many possible embodiments to which the principles of the disclosed technologies can be applied, it should be recognized that the illustrated embodiments are only examples of the technologies and should not be taken as limiting the scope of the invention. Rather, the scope of the invention is defined by the following claims and their equivalents. I therefore claim as my invention all that comes within the scope of these claims.

The invention claimed is:

1. A method for configuring a terminal device in a building, comprising:
   receiving, using the terminal device, a device identifier for the terminal device, after the terminal device is positioned in the building;
   sending, by the terminal device, the device identifier from the terminal device to a configuration server;
   receiving, by the terminal device, configuration information for the terminal device from the configuration server, the configuration information comprising a physical location of the terminal device in the building; and
   self-configuring the terminal device based on the configuration information.

2. The method of claim 1, wherein the configuration information further comprises an orientation of the terminal device relative to a surface of the building.

3. The method of claim 1, wherein the configuration information further comprises an elevator group with which the terminal device works.

4. The method of claim 1, wherein the terminal device comprises a destination call input device for an elevator system.

5. The method of claim 1, wherein the terminal device comprises a lock for a door.

6. The method of claim 1, wherein the device identifier comprises a string or a number.

7. The method of claim 1, wherein the receiving, using the terminal device, of the device identifier is over a wireless connection.

8. The method of claim 1, further comprising generating the configuration information using a computer-based layout tool.

9. A system, comprising:
   a configuration server; and
   a terminal device in a building, the terminal device being coupled to the configuration server, the terminal device comprising:
      a processor; and
      memory coupled to the processor, wherein the memory includes processor-executable instructions to:
         receive a device identifier for the terminal device, after the terminal device is positioned in the building,
         send the device identifier to a configuration server,
         receive configuration information for the terminal device from the configuration server, the configuration information comprising a physical location of the terminal device in the building, and
         configure the terminal device based on the configuration information.

10. The system of claim 9, further comprising a removable storage medium coupled to the configuration server, the removable storage medium storing the configuration information.

* * * * *